(12) United States Patent
Drion et al.

(10) Patent No.: US 6,594,259 B1
(45) Date of Patent: Jul. 15, 2003

(54) NETWORK ELEMENT INTERCONNECTION MANAGEMENT SYSTEM

(75) Inventors: Christophe Drion, Gif sur Yvette (FR); Olivier Chambon, Paris (FR); Philippe Coujoulou, Chaville (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/449,900

(22) Filed: Dec. 2, 1999

(30) Foreign Application Priority Data

Dec. 3, 1998 (FR) .......................................... 98 15272

(51) Int. Cl.[7] .............................................. H04Q 11/00
(52) U.S. Cl. ....................................... 370/360; 370/381
(58) Field of Search ................................ 370/357, 360, 370/381, 382, 383, 384

(56) References Cited

U.S. PATENT DOCUMENTS

| | | | | | |
|---|---|---|---|---|---|
| 3,812,294 | A | * | 5/1974 | Pedersen | 370/370 |
| 5,384,771 | A | * | 1/1995 | Isidoro et al. | 370/254 |
| 5,384,773 | A | * | 1/1995 | Olnowich et al. | 370/358 |
| 5,548,584 | A | * | 8/1996 | Beck et al. | 370/359 |
| 5,666,349 | A | * | 9/1997 | Petri | 370/360 |
| 6,253,244 | B1 | * | 6/2001 | Moore et al. | 709/231 |
| 6,460,086 | B1 | * | 10/2002 | Swaminathan et al. | 709/236 |

OTHER PUBLICATIONS

S. Johansson, "Transport Network Involving a Reconfigurable WDM Network Layer—A European Demonstration", Journal of Lightwave Technology, vol. 14, No. 6, Jun. 1, 1996, pp. 1341–1348 XP000598537.

Dan Tian, "A Software Architecture Supporting CMIP Management Information Bases of ATM Switches", Globecom '95, IEEE Global Telecommunications Conference, Nov. 14–16, 1995, pp. 1862–1866, XP000633611, Institute of Electrical and Electronics Engineers.

J. Blume et al, "Control and Operation of SDH Network Elements", Ericsson Review, vol. 69, No. 3, Jan. 1, 1992, pp. 62–77, XP000323321.

* cited by examiner

*Primary Examiner*—Huy D. Vu
*Assistant Examiner*—Daniel Ryman
(74) *Attorney, Agent, or Firm*—Sughrue Mion, PLLC

(57) ABSTRACT

A system for managing interconnections between connection points of a network element controlled by a management center includes the use of an information model. The management system establishes the information model on the basis of initial data and allowing for limitations in the network element at a given time. It updates the model and communicates the model and its updates to the management center to enable it to set up paths in the network element.

4 Claims, 1 Drawing Sheet

NETWORK ELEMENT INTERCONNECTION MANAGEMENT SYSTEM

BACKGROUND OF THE INVENTION

1. Field of the Invention

The invention relates to a network element interconnection management system.

2. Description of the Prior Art

A network element interconnection management system includes management hardware and software enabling it to set up paths in the network element. Logically, all interconnections must be possible within the network element.

An interconnection operation entails setting up a path in the network element from an input connection point of the network element to any output connection point of the element.

To this end the management system must know the number of input connection points (incoming fibers, for example) and the number of output connection points (outgoing fibers, for example) of the network element.

Unfortunately, in practice, there are limitations which do not allow all of the interconnections which logically would seem to be possible.

The algorithms defining information models relating to the connection points of a network element which already exist for controlling network elements do not give any description of possible interconnection limitations of the network element.

At present the algorithms do not obtain the information from the network itself but from a predetermined description which is necessarily static and which is provided by the vendor of the system.

There can be various reasons for interconnection limitations in a network element:

- a network element may be incapable of interconnecting certain connection points (or ports) because of a technological limitation. For example, the wavelength interconnection algorithm is not capable of making an interconnection between an incoming fiber transporting a signal at one wavelength and an outgoing fiber transporting the signal at another wavelength, because of an initial configuration of the hardware which cannot be changed,
- a network element may not be fully equipped (for cost reasons). This is an equipment level problem and interconnection may then never be possible, because of limitations associated with the presence of the static equipment,
- a network element may never be capable of supporting two particular interconnections at the same time because they would necessitate use of a hardware resource of the network element that cannot be shared (for example, a circuit element needed to set up two distinct paths),
- a network element may not support an interconnection imposed by an earlier interconnection. The network element allocates internal resources to support the interconnections and an interconnection that has previously been set up may lead to an interconnection limitation that would not have occurred if resources had been allocated in a different order.

This problem can be solved by reallocating the hardware resources allocated to the interconnections. This procedure, referred to as rearrangement, may or may not temporarily interfere with traffic already set up in the network element.

A limitation can be identified as:

- a static interconnection limitation (due to hardware or software), in which case the network element is never able to establish some interconnections,
- a dynamic interconnection limitation (due to hardware or software), in which case an interconnection capacity may be impossible at a given time for historical reasons (because of earlier interconnections). In this case there is one or more solutions to the problem of re-establishing interconnection capacity, by carrying out a rearrangement.

In most electrically switched networks, the management system uses data which describes the characteristics of the hardware. The problem of a static interconnection limitation can of course arise if the hardware is inadequate.

The network element static interconnection information is not stored in the network element and the network element management system must obtain this information from another information base (generally a document defining the particular product).

Dynamic interconnection limitations are a problem which is new because it stems from network elements whose number of transmission resources is not fixed, and in this case optical network elements have configuration capacities which are dynamic, i.e. which can be modified from time t to time t+1. At present there is no known solution to this problem.

The object of the present invention is to address the above problems.

The proposed system in accordance with the invention enables the management system and more particularly the path search algorithm used in the system to take decisions based on an exact knowledge of what is happening in the network element.

SUMMARY OF THE INVENTION

The present invention consists in a system for managing interconnections between connection points of a network element including the use of an information model, the network element being controlled by a management center, which management system includes:

- means for establishing the information model on the basis of initial data and allowing for limitations in the network element at a given time,
- means for updating the model, and
- means for communicating the model and its updates to the management center to enable it to set up paths in the network element.

The means for establishing the information model include:

- means for defining all connection points as objects that can be interconnected, producing an initial object matrix, and
- means for modifying the initial object matrix, by adding for each object the set of all unallocated objects to which it can be connected or the set of all objects already allocated to which it temporarily cannot be connected and solutions enabling interconnection with those objects, to obtain a new updated object matrix.

The means for updating the new matrix include means for determining solutions for setting up interconnections using operations of disconnecting established interconnections and/or of rearranging one or more established interconnections and writing those solutions for the object concerned.

Other features and advantages of the invention will become apparent on reading the following description which is given by way of non-limiting example and with reference to the drawing.

DETAILED DESCRIPTION OF THE PREFERRED EMBODIMENT

Figure 1:
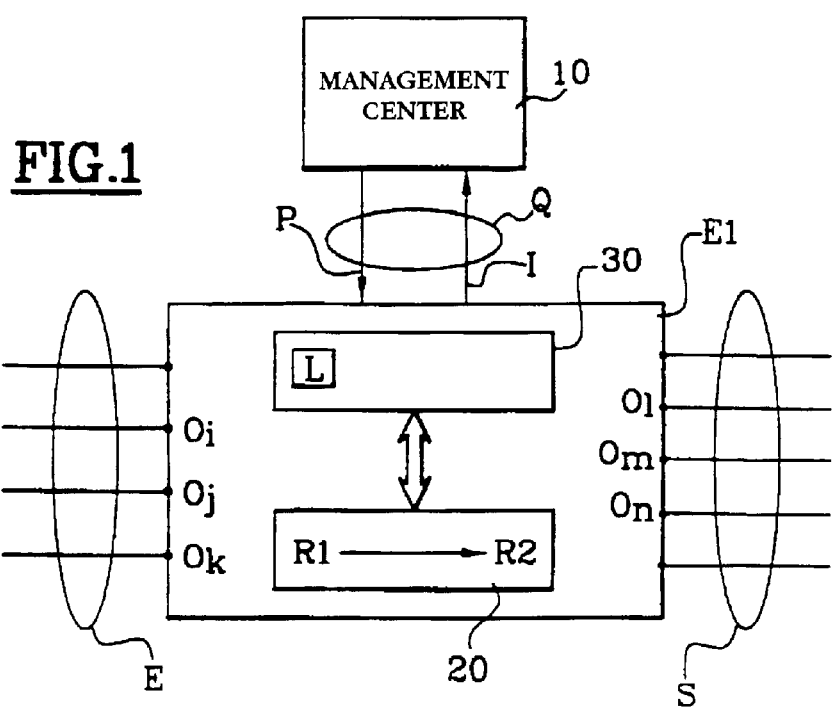
FIG. 1 is a block diagram of an interconnection management system in accordance with the invention.

The invention enables the management system shown in FIG. 1 to determine possible solutions to the problem of alleviating blocking situations in a particular network element because the element supplies it with a rearrangement solution and the impacts on existing traffic of that solution (i.e. the rearrangement), if it is adopted.

The network element E1 transmits the interconnection capacities of a network element to the interconnection management center 10 via a standard communication interface Q.

That information 1 is automatically updated by the network element, which is able to notify changes to the management system.

The management center 10 dialogs with the network element E1 via the interface Q (signal P) and is informed by the network element (signal 1) of current interconnection limitations and possible solutions, such as rearrangements (including information on their possible impact on traffic).

In the software implementation of the solution, the connection points are defined as objects $O_i$, $O_l$ using an object-oriented language such as GDMO or C++, for example.

In the case of bidirectional connections, there is no distinction between source objects and destination objects.

In accordance with the invention, the network element E1 maintains a database 20 containing the limitations for each of the objects which can be interconnected (both source objects and destination objects).

To this end, the database contains either a list of objects not allocated for an interconnection $(O_i, O_l)$ l≠m, Om being already allocated, or a list containing only the objects allocated for the interconnections $(O_i, O_m)$.

As stated above, by definition, a source object cannot be interconnected to another source object $(O_i, O_l)$ i≠l, and a destination object can never be interconnected to another destination object. It is therefore unnecessary to describe these limitations in the database.

If the choice is to define a database containing a list of non-allocated objects:

for each non-allocated object, the database includes a list of possible solutions enabling the interconnection. If that list is empty, then there is no solution, apart from increasing the capacities of the hardware.

Each possible solution is a sequence of operations to be applied to the network element to enable the interconnection.

The network element E1 consequently maintains a database on the interconnection capacities, in particular on the interconnections which are impossible.

To this end, the network element includes software L and a control circuit 30 adapted to execute the software. The software L is adapted to describe each connection point of the network element as an object, on the basis of initial data previously loaded into a memory of the control circuit, and to maintain a database of the limitations for each of the objects in the base.

For a given object, the database 20 contains a list of objects to which the object could be connected or could not be connected. The list is updated by the software as and when allocations are made, i.e. as and when an object is allocated to another object for an interconnection.

In practice, in the case of static limitations, if the number of objects to which an object cannot be connected is smaller than the number of objects to which it can be interconnected, it is the list of objects to which it cannot be connected that is stored in the base.

The original database is therefore updated by the software, which is also adapted to maintain, for each object, information relating to the reason why interconnection is impossible and to supply a solution in the case of a possible solution.

To this end, the software includes a search algorithm with the following steps for a given object:

searching for objects not allocated to an interconnection, allocating those objects to the object concerned to define interconnection solutions, if all the objects are allocated, searching disconnection and/or rearrangement solutions and supplying the penalties associated with each solution compared to another solution.

These penalties include the time to rearrange an interconnection and/or the degrees of priority to be granted to an interconnection in accordance with the traffic.

The algorithm is adapted to supply the rearrangement times associated with the interconnection solution(s) it proposes for all the interconnections which exist at a given time.

Figure 2:
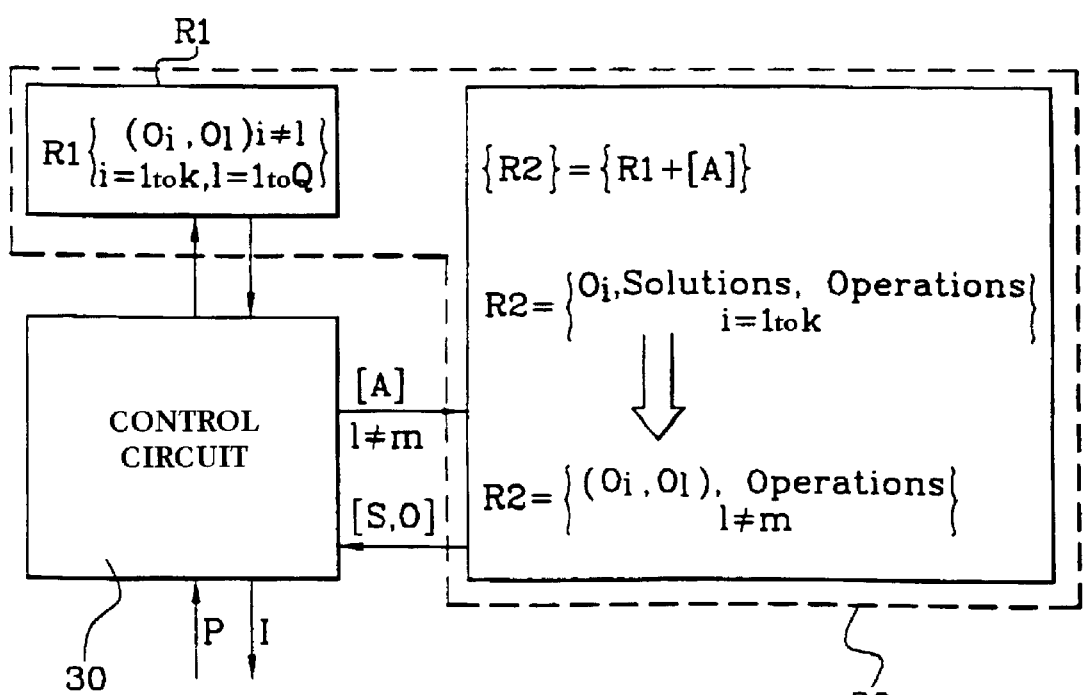
FIG. 2 is a block diagram of the architecture of the network element responsible for establishing the model and for updates.

The implementation of the invention will now be described (see FIG. 2) in the context of the formal specifications defined for the Q3 interface using a standard ITU-T M3100 information model.

The model provides a matrix of initial objects R1 containing all possible interconnections from the source objects $O_i$ and the destination objects $O_l$, l≠i available to the network element. For example, if there are five source objects (five inputs) and five destination objects (five outputs) the number of interconnections is logically !5 (factorial 5).

In accordance with the invention, the matrix R1 is enriched with an attribute A to obtain an updated matrix R2. The attribute A is the list of interconnection limitations.

The initial matrix R1 or the initial database R1 is therefore modified to give the matrix R2. The matrix R1 is modified to contain all predetermined limitations due to hardware (static limitations) and limitations encountered as and when new interconnections are set up (dynamic limitations).

An object $O_i$ of matrix R1 (i=1 to K, i≠l) is associated with a list of objects $O_l$ (l=1 to Q, l≠m, $O_m$ already allocated) to which it can be connected or a list of objects to which it cannot be connected, depending on the numbers of objects.

If the list $(O_l)$ is empty, there is no solution.

If the list $(O_l)$ is not empty, there is a set of possible solutions.

Each possible solution S is accompanied by the set of operations O necessary to implement it.

These operations are disconnecting one or more interconnections already set up and/or rearranging existing interconnections. When the network element receives the choice made by the management system, it carries out the series of operations necessary to implement the chosen solution before making the interconnection.

In the case of a solution consisting in a rearrangement, there is associated information on the time taken to carry out the rearrangement.

The network element E1 transmits the solution S and operation O information in the signal 1 to the management center 10 which can therefore make a choice in full knowledge of the facts.

There is claimed:

1. A system for managing interconnections between connection points of a network element including the use of an information model, said network element being controlled by a management center, which management system comprises:

means for establishing said information model on the basis of initial data and allowing for limitations in said network element at a given time, means for updating said model, and means for communicating said model and its updates to said management center to enable it to set up paths in said network element, wherein said means for establishing said information model comprises:

means for defining all connection points as objects that can be interconnected, producing an initial object matrix, and means for modifying the initial object matrix, by adding for each object the set of all unallocated objects to which it can be connected or the set of all objects already allocated to which it temporarily cannot be connected and solutions enabling interconnection with those objects, to obtain a new updated object matrix.

2. The system claimed in claim 1 wherein said means for updating said new matrix comprises means for determining solutions for setting up interconnections using operations of disconnecting established interconnections.

3. The system claimed in claim 1 wherein said means for updating said new matrix include means for determining solutions for rearranging one or more established interconnections and writing those solutions for the object concerned.

4. The system claimed in claim 1 wherein said means for updating said new matrix comprises means for determining solutions for setting up interconnections using operations of disconnecting established interconnections and for rearranging one or more established interconnections and writing those solutions for the object concerned.

* * * * *